United States Patent
Aikawa

(10) Patent No.: US 7,155,626 B2
(45) Date of Patent: Dec. 26, 2006

(54) DATA PROCESSOR INCLUDING CLOCK THINNING-OUT CIRCUIT

(75) Inventor: Hiroko Aikawa, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 537 days.

(21) Appl. No.: 10/351,130

(22) Filed: Jan. 24, 2003

(65) Prior Publication Data

US 2003/0145243 A1  Jul. 31, 2003

(30) Foreign Application Priority Data

Jan. 25, 2002  (JP)  ............................. 2002-017353

(51) Int. Cl.
  *G06F 1/12*  (2006.01)
(52) U.S. Cl. .................................... 713/400; 713/600
(58) Field of Classification Search ................ 713/400, 713/500, 600
  See application file for complete search history.

(56) References Cited

U.S. PATENT DOCUMENTS

| | | | | |
|---|---|---|---|---|
| 5,083,309 A | * | 1/1992 | Beysson | 705/55 |
| 5,404,402 A | * | 4/1995 | Sprunk | 713/189 |
| 5,881,271 A | * | 3/1999 | Williams | 713/401 |
| 6,275,068 B1 | * | 8/2001 | Kermani et al. | 326/93 |
| 6,275,950 B1 | * | 8/2001 | Yeh | 713/401 |
| 6,327,661 B1 | | 12/2001 | Kocher et al. | |
| 6,575,373 B1 | * | 6/2003 | Nakano | 235/492 |
| 6,735,712 B1 | * | 5/2004 | Maiyuran et al. | 713/501 |
| 6,864,730 B1 | * | 3/2005 | Reiner et al. | 327/164 |
| 6,944,295 B1 | * | 9/2005 | Einfeldt et al. | 380/28 |
| 2001/0038637 A1 | | 11/2001 | Reiner et al. | |
| 2002/0124178 A1 | * | 9/2002 | Kocher et al. | 713/193 |

FOREIGN PATENT DOCUMENTS

| | | |
|---|---|---|
| EP | 1085393 A2 | 3/2001 |
| JP | 05-257562 | 10/1993 |
| JP | 11-65696 | 3/1999 |
| JP | 2001-094550 | 4/2001 |
| JP | 2002-312056 | 10/2002 |

OTHER PUBLICATIONS

The European Search Report dated Jun. 10, 2003.
Japanese Office Action of Aug. 4, 2004.
English Translations of the indicated portions of the above-referenced Japanese Office Action.

* cited by examiner

*Primary Examiner*—Chun Cao
(74) *Attorney, Agent, or Firm*—Darryl G. Walker; Bradley T. Sako

(57) ABSTRACT

A data processor which may prevent data processing being executed from being analyzed based on the power consumption has been disclosed. A data processor (100) may include clock generating circuit (101), a random number generating circuit (102), a clock thinning-out circuit (103), and circuit resources (105 to 109). A clock signal (CLOCK A) may be thinned out by clock thinning out circuit (103) in correspondence to a random number generated by a random number generating circuit (102) to provide a clock signal (CLOCK C) to circuit resources (105 to 109). In this way, correct analysis of data processing being executed based on monitoring power consumption may be prevented.

17 Claims, 6 Drawing Sheets

DATA PROCESSOR INCLUDING CLOCK THINNING-OUT CIRCUIT

TECHNICAL FIELD

The present invention relates generally to a data processor and more particularly to a data processor that may process data with various circuit resources that may operate synchronously with a clock signal.

BACKGROUND OF THE INVENTION

Data processors, such as microcomputers, may be utilized to perform various kinds of data processing. In general, with a data processor, a clock signal is generated by a clock generating circuit and various circuit resources operate synchronously with the clock signal. In this way, various kinds of data processing can be executed. While such data processors can be utilized in various types of applications, some data processors conceal the contents of data processing in order to prevent such contents from being improperly used.

In a data processor as described above, however, because the various circuit resources operate synchronously with a clock signal, respective power consumption states of the various circuit resources can become identical to one another when executing the same data processing. Thus, the data processing which is being executed can be readily analyzed by monitoring the power consumption.

In view of the above discussion, it would be desirable to provide a data processor in which detection or analysis of data processing being executed on the basis of power consumption may be reduced.

SUMMARY OF THE INVENTION

According to the present embodiments, a data processor which may prevent data processing being executed from being analyzed based on the power consumption is disclosed. A data processor may include clock generating circuit, a random number generating circuit, a clock thinning-out circuit, and circuit resources. A clock signal may be thinned out by a clock thinning out circuit in correspondence to a random number generated by a random number generating circuit to provide a clock signal to circuit resources. In this way, correct analysis of data processing being executed based on monitoring power consumption may be prevented.

According to one aspect of the embodiments, a data processor may include a first plurality of circuit resources, a clock generating circuit, and a clock thinning-out circuit. A first plurality of circuit resource may operate synchronously with a second clock signal. A clock generating circuit may generate a first clock signal. A clock thinning-out circuit may thin out a first clock signal to generate a second clock signal.

According to another aspect of the embodiments, a data processor may include a signal generator. A signal generator may provide a thinning-out signal to the clock thinning-out circuit.

According to another aspect of the embodiments, a signal generator may include a random number generating circuit. A random number generating circuit may provide an essentially random number as a thinning-out signal. A clock thinning-out circuit may thin out a first clock signal to provide a second clock signal when an essentially random number has a predetermined value.

According to another aspect of the embodiments, a random number generating circuit may generate essentially random numbers synchronously with a first clock signal.

According to another aspect of the embodiments, a clock thinning-out circuit may thin out a first clock at a variable rate to provide a second clock.

According to another aspect of the embodiments, a data processor may include a signal generator. A signal generator may provide a thinning-out signal to a clock thinning-out circuit. A clock thinning-out circuit may provide a variable rate in response to the thinning-out signal.

According to another aspect of the embodiments, a data processor may include a second plurality of circuit resources. A second plurality of circuit resources may operate synchronously with a third clock signal provided by a clock thinning-out circuit. A clock thinning-out circuit may include a mode setting circuit. A mode setting circuit may selectively set a first mode in which a first clock signal is thinned out to provide a second clock signal and a first clock signal is not thinned out to provide a third clock signal. A mode setting circuit may selectively set a second mode in which a first clock signal is not thinned out to provide a second clock signal and a first clock signal is thinned out to provide a third clock signal. A mode setting circuit may selectively set a third mode in which a first clock signal is thinned out to provide a second clock signal and a first clock signal is thinned out to provide a third clock signal.

According to another aspect of the embodiments, a mode setting circuit may change the setting between the first, second and third modes over time.

According to another aspect of the embodiments, a data processor may include a signal generator. A signal generator may provide a thinning-out signal to a clock thinning-out circuit. A mode setting circuit may change the setting between a first, second, and third mode in response to a thinning-out signal.

According to another aspect of the embodiments, a data processor may include a clock generating circuit, a first circuit, and a first plurality of circuit resources. A clock generating circuit may generate a first clock signal. A first circuit may receive the first clock signal and generate a second clock signal by variably masking portions of a first clock signal to generate the second clock signal. A first plurality of circuit resource may operate synchronously with the second clock signal.

According to another aspect of the embodiments, a variable masking signal generating circuit may provide a variable masking signal. A first circuit may receive the variable masking signal and may mask a portion of the first clock signal in response to the variable masking signal having a predetermined value.

According to another aspect of the embodiments, a variable masking signal generating circuit may include a number generating circuit. A number generating circuit may receive a first clock signal and generate an essentially random number as a variable masking signal.

According to another aspect of the embodiments, an essentially random number may be generated for each clock cycle of a first clock signal.

According to another aspect of the embodiments, a first circuit may include a timing generating circuit and a mask circuit. A timing generating circuit may receive a variable masking signal and may provide a mask signal having a mask logic value when the variable masking signal has a predetermined value. A mask circuit may receive a mask signal and may mask a portion of a first clock signal to provide a second clock signal when a mask signal has a mask logic value.

According to another aspect of the embodiments, a variable masking signal may include a first variable masking portion and a second variable masking portion. A first circuit may include a first timing generating circuit, a second timing generating circuit, and a mask circuit. A first timing generating circuit may receive a first variable masking portion and provide a first mask signal having a first mask signal logic value when the first variable masking portion has a first predetermined value. A second timing generating circuit may receive a second variable masking portion and provide a second mask signal having a second mask signal logic value when the first variable masking portion has a second predetermined value. A mask circuit may be coupled to receive a first mask signal and a second mask signal and may mask a portion or the first clock signal to provide a second clock signal when the first mask signal has the first mask signal logic level and may mask a portion or the first clock signal to provide the second clock signal when the second mask signal has the second mask signal logic level.

According to another aspect of the embodiments, a processor circuit may include a clock generating circuit, a first circuit, a mode circuit, and a first plurality of circuit resources. A clock generating circuit may generate a first clock signal. A first circuit may receive the first clock signal and generate a second clock signal by variably masking portion of the first clock signal to generate the second clock signal. A mode circuit may be coupled to provide a third clock signal in response to the first clock signal in a first mode and in response to the second clock signal in a second mode. A first plurality of circuit resources may operate synchronously with the third clock signal.

According to another aspect of the embodiments, a mode circuit may provide a fourth clock signal in response to a second clock signal in a first mode and in response to a first clock signal in a second mode. A second plurality of circuit resources may operate synchronously with the fourth clock signal.

According to another aspect of the embodiments, a mode circuit may provide a third clock signal in response to a second clock signal in a third mode and may provide a fourth clock signal in response to a second clock signal in a third mode.

According to another aspect of the embodiments, a variable masking signal generating circuit may provide a variable masking signal. A first circuit may receive a variable masking signal and may mask a portion of a first clock signal to generate a second clock signal in response to a variable masking signal having a predetermined value. A mode circuit may operate in accordance with at least a portion of a variable masking signal.

DETAILED DESCRIPTION OF THE EMBODIMENTS

Various embodiments of the present invention will now be described in detail with reference to a number of drawings.

Figure 1:
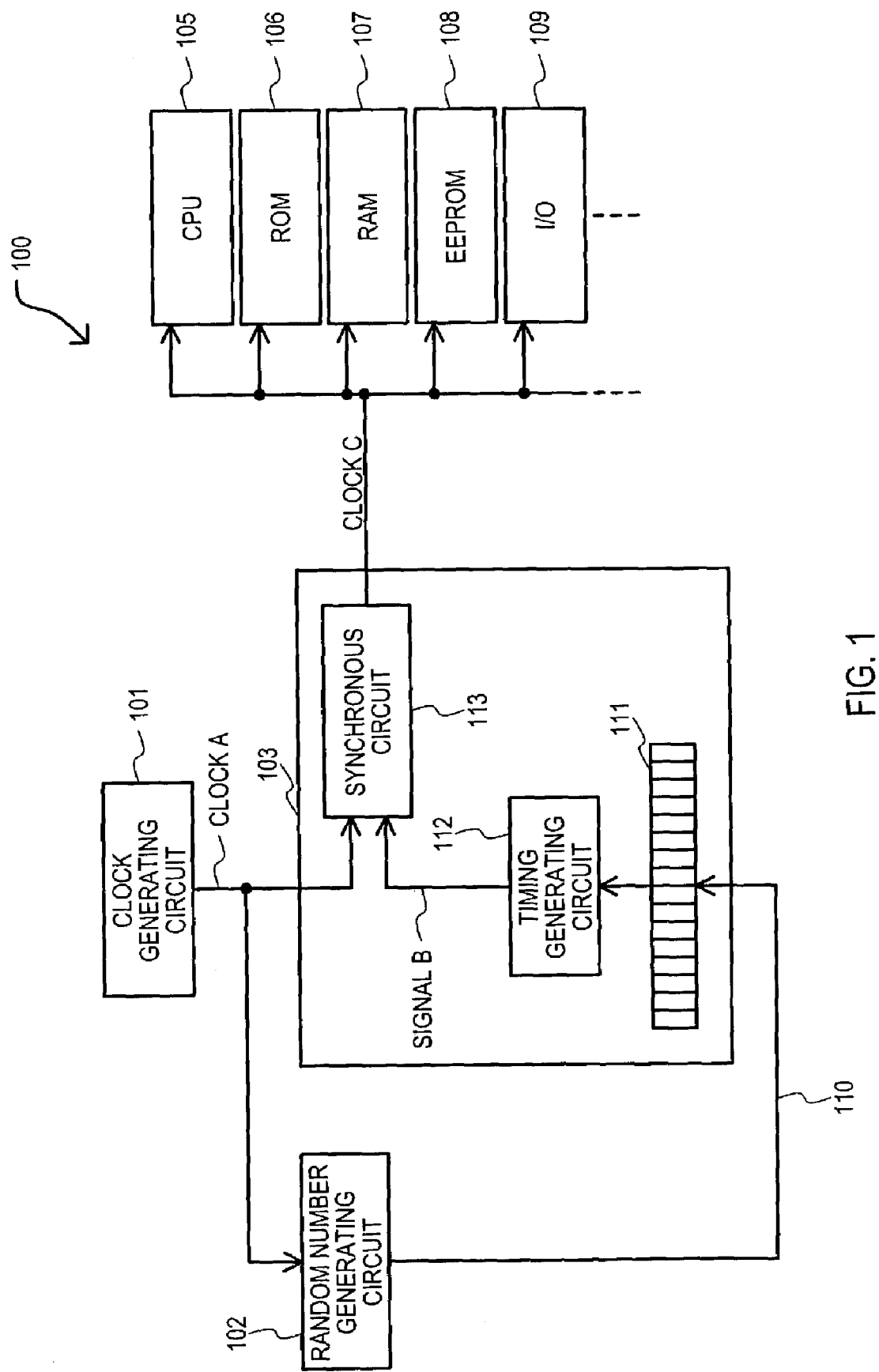
FIG. 1 is a block schematic diagram of a data processor according to an embodiment.

Referring to FIG. 1, a block schematic diagram of a data processor according to an embodiment is set forth and given the general reference character 100.

Data processor 100 may include a clock generating circuit 101, a random number generating circuit 102, and a clock thinning-out circuit 103. Clock generating circuit 101 may provide a clock signal (CLOCK A) to random number generating circuit 102 and clock thinning-out circuit 103. Random number generating circuit 102 may provide a random number via random number bus 110 to clock thinning-out circuit 103.

Data processor 100 may have various types of circuit resources such as a CPU (Central Processing Unit) 105, a ROM (Read Only Memory) 106, a RAM (Random Access Memory) 107, an EEPROM (Electrically Erasable Programmable ROM) 108, and an I/O (Input/Output) unit 109, as just a few examples, connected to receive a clock signal (CLOCK C) from clock thinning-out circuit 103.

Clock thinning-out circuit 103 may include a register circuit 111, a timing generating circuit 112, and a synchronous circuit 113. Register circuit 111 may receive a random number from random number bus 110 and may be operatively connected to provide an output to timing generating circuit 112. Timing generating circuit 112 may provide a signal (SIGNAL B) to synchronous circuit 113. Synchronous circuit 113 may receive clock signal (CLOCK A) and provide clock signal (CLOCK C) to circuit resources (105 to 109).

Figure 2:
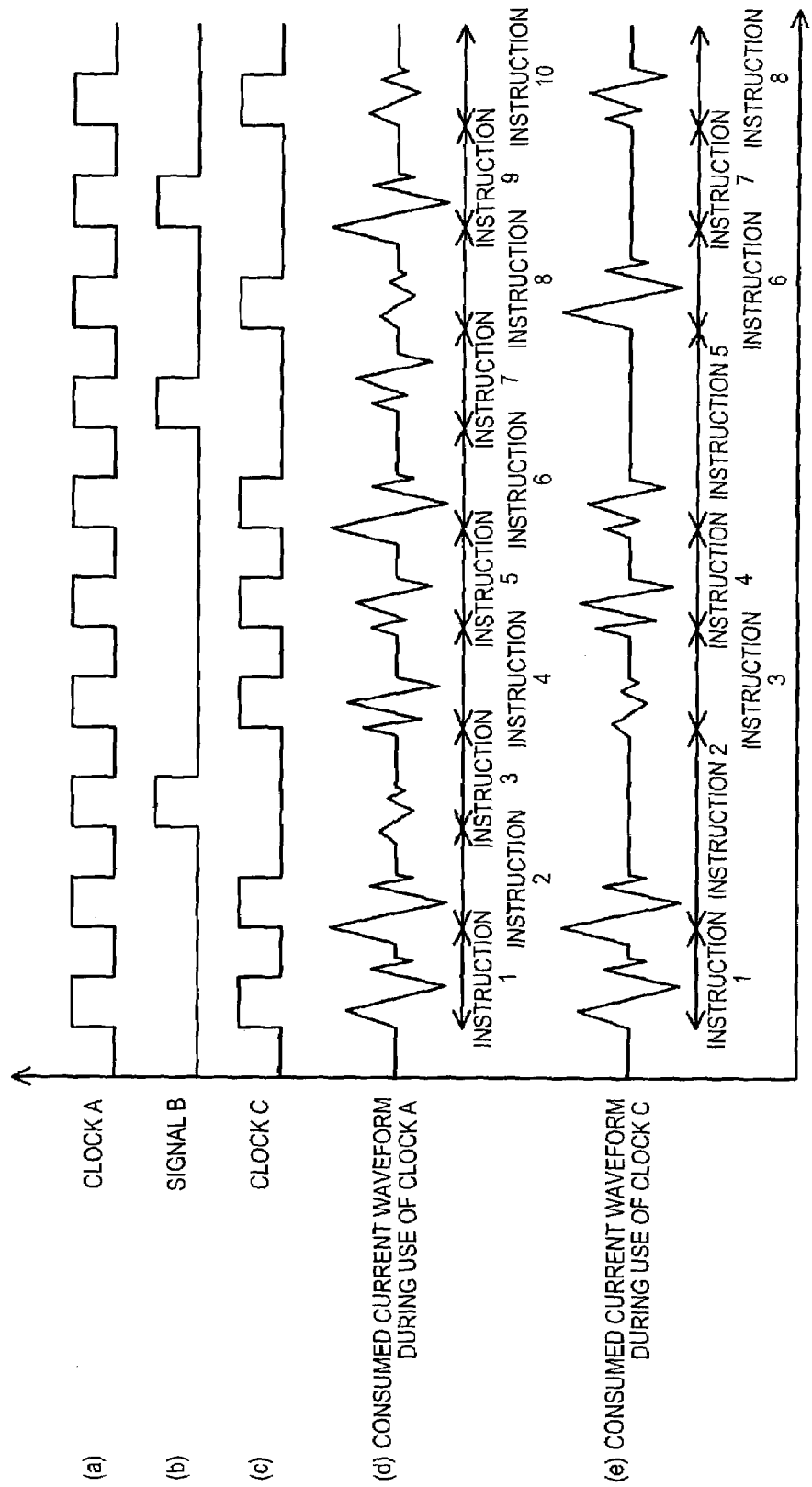
FIG. 2 is a timing diagram illustrating waveforms of signals and currents of data processor of FIG. 1 according to an embodiment.

FIG. 2 is a timing diagram illustrating waveforms of signals and currents of data processor 100 according to an embodiment. The operation of data processor 100 will now be described by referring to FIG. 2 in conjunction with FIG. 1.

Clock generating circuit 101 may generate a clock signal (CLOCK A) shown as FIG. 2(*a*) that may include rectangular pulses at essentially fixed intervals. Random number generating circuit 102 may successively generate random numbers synchronously with clock signal (CLOCK A) and provide the random numbers on random number bus 110. Register circuit 111 may temporarily hold random numbers generated by random number generator circuit 102.

Timing generating circuit 112 may include an internal register (not shown), which may act as a numeric value storing means in which a predetermined numeric value may be registered. As illustrated in FIG. 2(*b*), timing generating circuit 112 may provide a timing signal (SIGNAL B) at a time when the numeric value registered in the internal register matches a random number held in register circuit 111.

As shown in FIG. 2(*b*), synchronous circuit 113 may thin out clock signal (CLOCK A) upon reception of timing signal (SIGNAL B) to provide a resultant clock signal (CLOCK C). Circuit resources (105 to 109) may respectively operate synchronously with clock signal (CLOCK C). Clock signal (CLOCK C) may be obtained by thinning out clock signal (CLOCK A) in clock thinning-out circuit 103 to be supplied thereto.

Note, a random number generated by random number generating circuit 102 may include binary data having a predetermined number of digits and may be an artificial number which may be repeated at a fixed period. In addition, a numeric value registered in timing generating circuit 112 may be a plurality of binary data, such as "00001001, 00010010, 00110011, . . . ", for example, and may include the same number of digits as that of the random number or may also be a set of binary data such as "xxx1x1x1" which may be compared with the binary data in a specific digit of a random number.

In data processor 100 of the present embodiment, various types of circuit resources (105 to 109), such as CPU 105, may operate synchronously with a clock signal supplied thereto. In this way, various data processing may be executed. In this case, clock signal (CLOCK A) as shown in FIG. 2(a) may be generated by clock generating circuit 101. Clock signal (CLOCK A) may be thinned out at random by clock thinning-out circuit 103 to obtain a resultant clock signal (CLOCK C) as illustrated in FIG. 2(c). In this way, circuit resources (105 to 109) may operate synchronously with clock signal (CLOCK C) obtained through the above-mentioned thinning-out process.

In a case where circuit resources (105 to 109) execute the same series of data processing, the waveform of a consumed current when circuit resources (105 to 109) operate synchronously with clock signal (CLOCK A) without undergoing a thinning-out process is illustrated in FIG. 2(d). However, when clock signal (CLOCK A) undergoes a thinning-out process to provide a clock signal (CLOCK C) in which circuit resources (105 to 109) operate synchronously with, the waveform of a consumed current can be as illustrated in FIG. 2(d), for example. Thus, in data processor 100 according to an embodiment, because clock signal (CLOCK A) may be randomly thinned out to obtain a resultant clock signal (CLOCK C), even if data processing in circuit resources (105 to 109) are identical to one another, the waveform of consumed current may be changed at random.

Because in data processor 100 according to an embodiment, the waveform of the consumed current may be changed at random even when the data processing in circuit resources (105 to 109) is identical to one another, the contents of the data processing being executed may hardly be analyzed even if the consumed current is monitored. In addition, because the clock thinning-out circuit 103 may thin out clock signal (CLOCK A) in correspondence to random numbers generated successively and synchronously with clock signal (CLOCK A), it may be possible to generate a random clock signal (CLOCK C) with a simple circuit configuration.

The present invention is not intended to be limited to the above-mentioned embodiment, various changes, substitutions, and alterations may be made without departing from the spirit and scope of the invention. For example, while in a data processor 100 of the above-mentioned embodiment, a construction in which respective portions may be formed integrally with one another is supposed, data processor 100 may also be formed with a plurality of detachable units (not shown), as but one example.

In addition, in the embodiment of FIG. 1, random numbers, which may be generated synchronously with a clock signal as an output signal and may undergo a long-term change during the operation of the clock signal, have been utilized. However, as to such an output signal, any signal may be available as long as it undergoes the long-term changes during the generation of the clock signal. For example, a specific bit on a bus line of a parallel bus, a power source voltage, the outside air temperature, a time instant of occurrence of manual manipulation, data input, or the like may be utilized, as just a few examples.

Furthermore, while in the above-mentioned embodiment, random number generating circuit 102 may generate random numbers with a clock signal (CLOCK A) not thinned out as an input, it may also be possible to make clock signal (CLOCK C), obtained through a thinning-out process, an input to random number generating circuit 102. In this case, if the operation of random number generating circuit 102 is stopped at a timing in which clock signal (CLOCK C) is obtained through the thinning-out process, the operation of the whole apparatus may be stopped. Thus, a delay circuit may be inserted to prevent the operation of random number generating circuit 102 from being stopped at the timing of thinning-out to proved clock signal (CLOCK C).

In addition, while in the above-mentioned embodiment, clock thinning-out circuit 103 may thin out clock signal (CLOCK A) at a fixed rate in correspondence to circulating artificial numbers, the rate at which clock thinning-out circuit 103 thins out clock signal (CLOCK A) may be made variable. In this way, the waveform of the consumed current may be further changed at random.

For example, in a case where a plurality of binary data, such as "00001001", "00010010", . . . ", having the same digit as that of a random number is registered in timing generating circuit 112, it may be possible to provide a first state in which all of a plurality of binary data is valid and a second state in which only a part of the binary data is valid. In the case where a set of binary data compared with binary data having specific digits of random numbers as in "xxx1x1x1" are registered, it may be possible to provide a first state in which all of the binary data having the specific digits are valid and a second state in which only a part of the specific digits are valid.

Furthermore, in order to make the rate at which the clock signal is thinned out variable over a long term, it may be possible to switch the first and second states over to each other every lapse of a specific time, as just one example. It may also be possible to switch the first and second states over to each other in correspondence to the random numbers generated by random number generating circuit 102.

Figure 3:
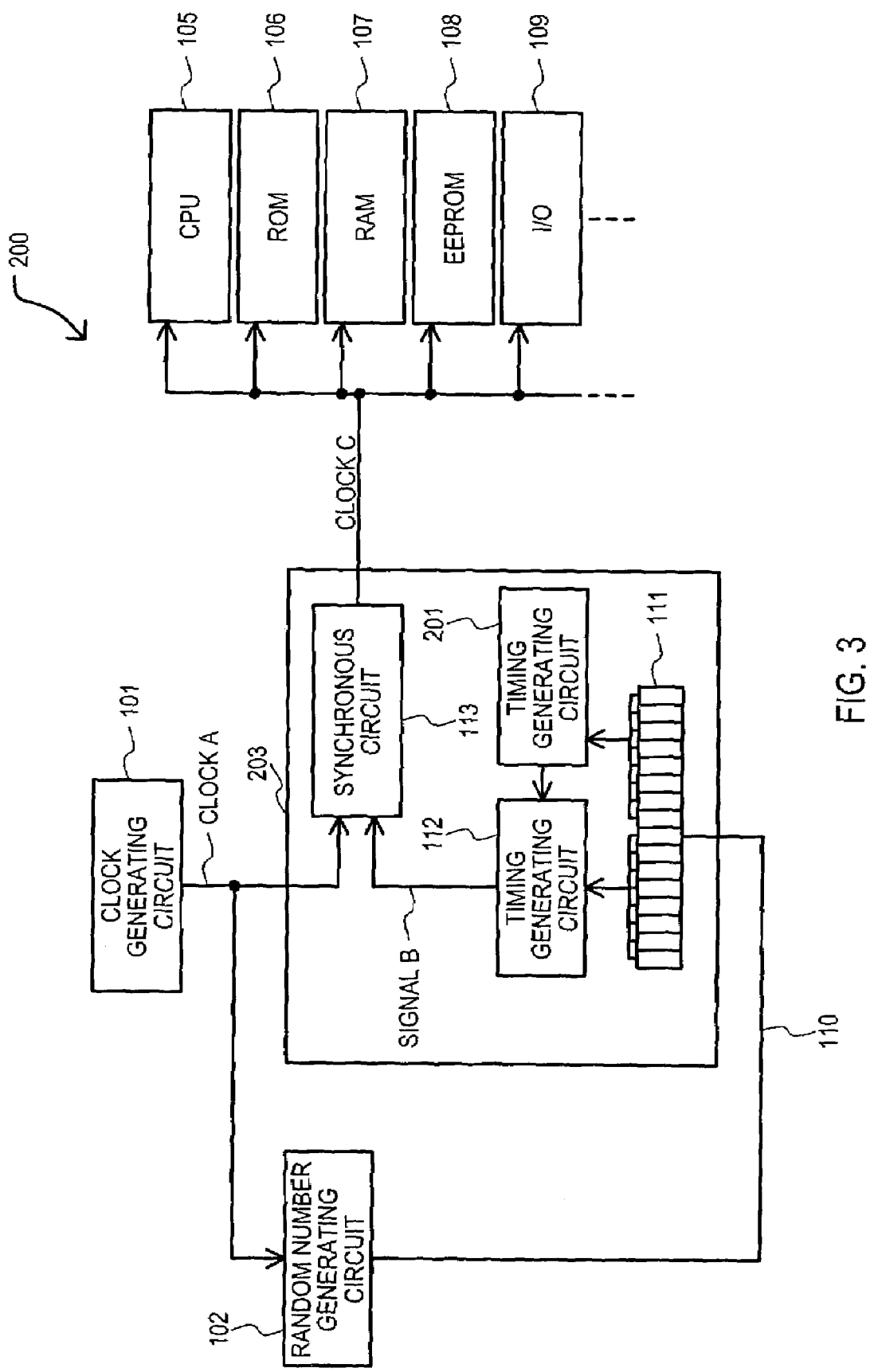
FIG. 3 is a block schematic diagram of a data processor according to an embodiment.

Referring now to FIG. 3, a block schematic diagram of a data processor according to an embodiment is set forth and given the general reference character 200. Data processor 200 may include similar constituents as data processor 100 of FIG. 1 and such constituents may be referred to by the same reference character.

Data processor 200 may differ from data processor 100 in that a clock thinning-out circuit 203 may be included instead of clock thinning-out circuit 103. Clock thinning-out circuit 203 may include a register 111, timing generating circuit 112, and a synchronous circuit 113 similar to clock thinning-out circuit 103 of FIG. 1. However, clock thinning-out circuit 203 may also include a timing generating circuit 201. Timing generating circuit 201 may receive a stored random number from register 111. Timing generating circuit 112 may utilize the upper 8 digits of a random number stored in register 111 and timing generating circuit 201 may utilize the lower 8 digits of a random number stored in register 111. In this way, timing generating circuits (112 and 201) may operate at respective timings independently from each other and may independently provide timing signal (SIGNAL B) when a respective 8-digits match their respective stored 8-digits.

Figure 4:
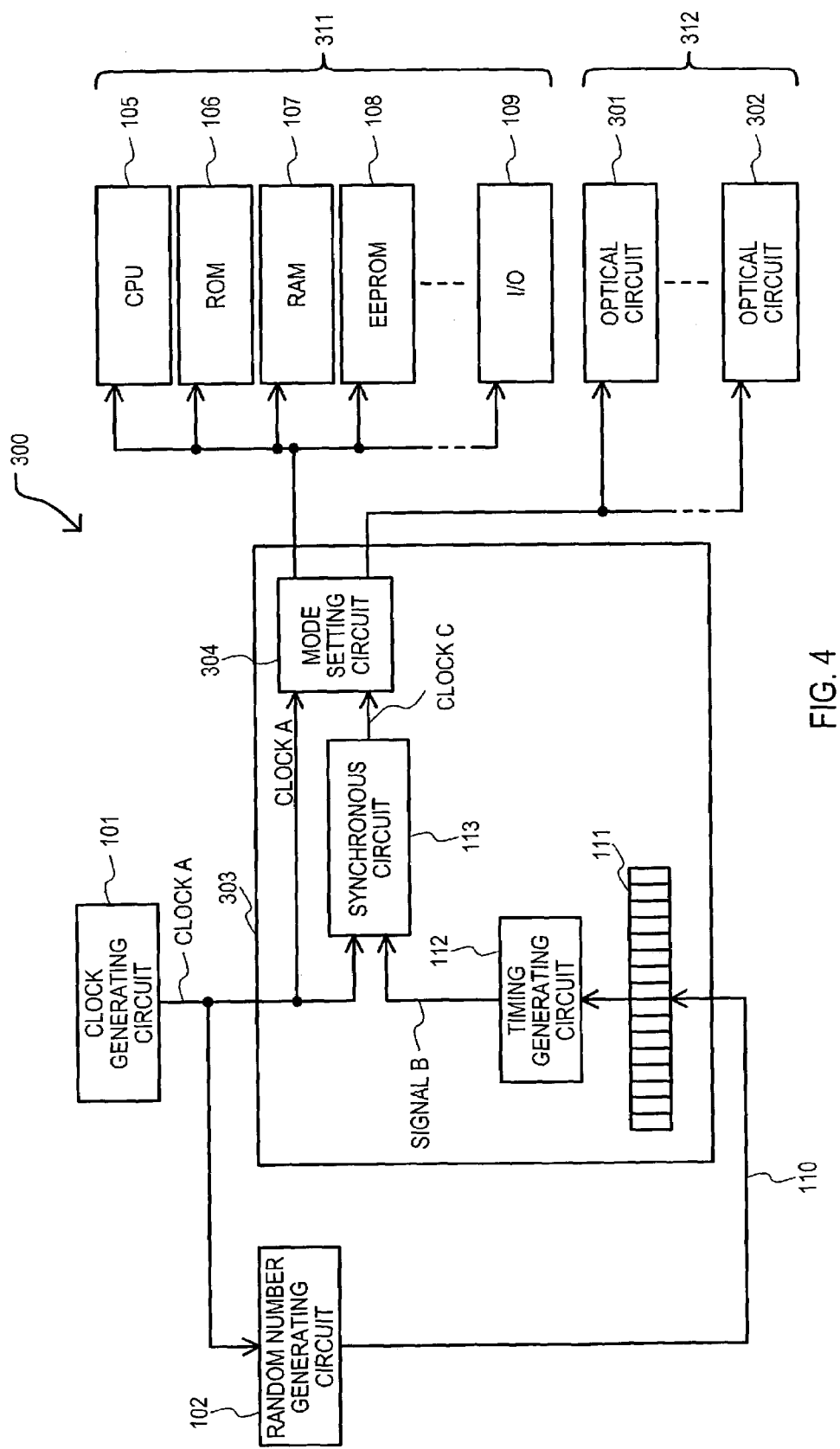
FIG. 4 is a block schematic diagram of a data processor according to an embodiment.

Referring now to FIG. 4, a block schematic diagram of a data processor according to an embodiment is set forth and given the general reference character 300. Data processor 300 may include similar constituents as data processor 100 of FIG. 1 and such constituents may be referred to by the same reference character.

In data processor 300, a plurality of circuit resources (105 to 109, 301 and 302) may be grouped into a first resource group 311 and a second resource group 312 which can operate asynchronously with respect to each other. First resource group 311 may include circuit resources (105 to 109) and second resource group 312 may include circuit resources (301 and 302).

Data processor 300 may include a clock thinning-out circuit 303. Clock thinning-out circuit 303 may include a register 111, timing generating circuit 112, and a synchronous circuit 113 similar to clock thinning-out circuit 103 of FIG. 1. However, clock thinning-out circuit 303 may also include a mode setting circuit 304. Mode setting circuit 304 may receive clock signals (CLOCK A and CLOCK C). In accordance with a mode, mode setting circuit 304 may provide either clock signal (CLOCK A or CLOCK C) to first resource group 311 and may provide either clock signal (CLOCK A or CLOCK C) to second resource group 312.

The following modes may be set:

(1) a first mode in which clock signal (CLOCK C) is provided to first resource group 311 and clock signal (CLOCK A) is provided to second resource group 312.

(2) a second mode in which clock signal (CLOCK A) is provided to first resource group 311 and clock signal (CLOCK C) is provided to second resource group 311.

(3) a third mode in which clock signal (CLOCK C) is provided to both first and second resource groups (311 and 312).

Furthermore, such first to third modes may be switched over to each other whenever data processor 300 is activated. First to third modes may also be switched over to each other for a long term during the operation of data processor 300. Moreover, in a case where there are two or more groups or clock signals as described above, it may be possible to set three or more operation modes.

Figure 5:
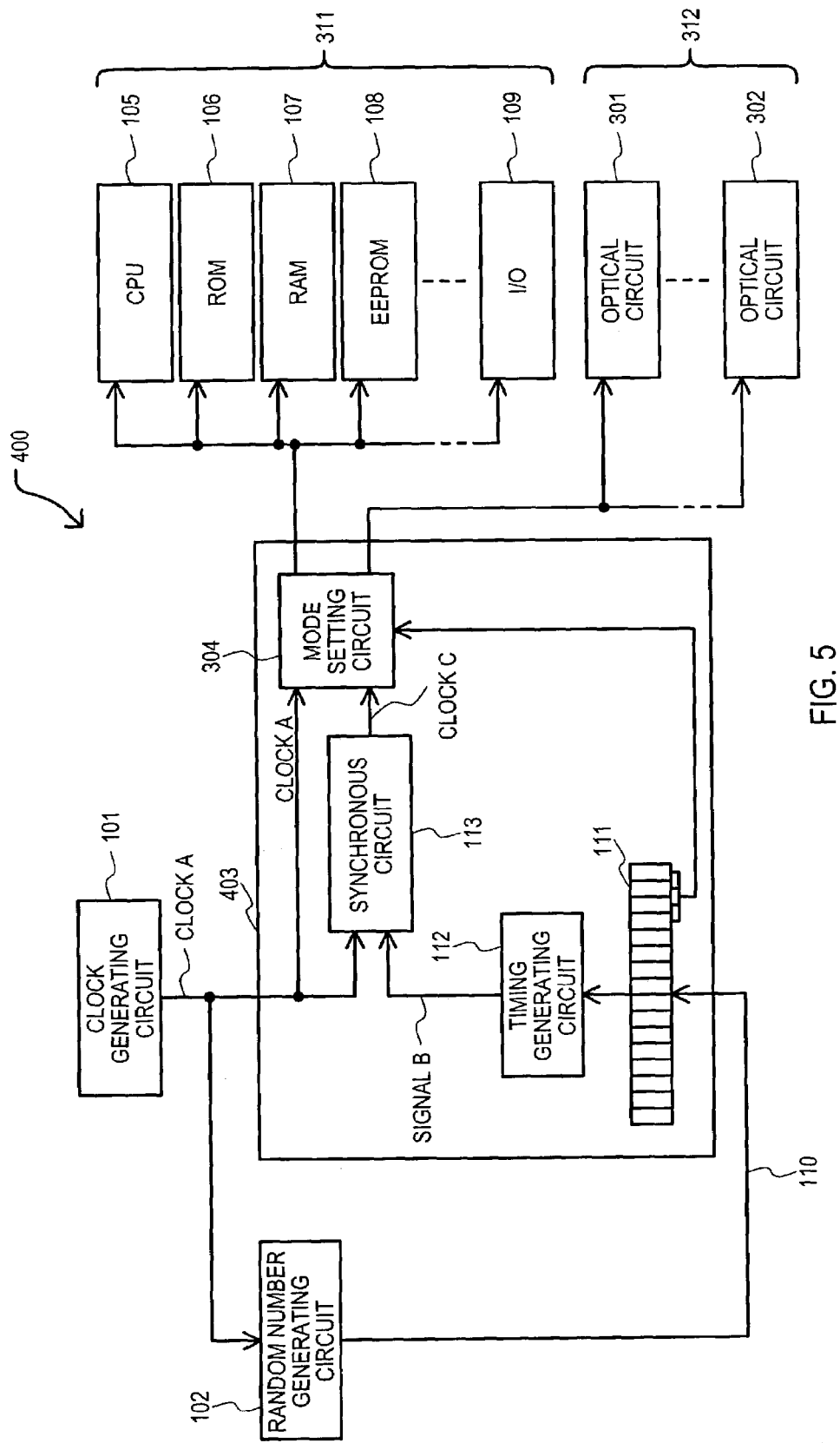
FIG. 5 is a block schematic diagram of a data processor according to an embodiment.

Referring now to FIG. 5, a block schematic diagram of a data processor according to an embodiment is set forth and given the general reference character 400. Data processor 400 may include similar constituents as data processor 300 of FIG. 3 and such constituents may be referred to by the same reference character.

Data processor 400 may differ from data processor 300 in that a clock thinning-out circuit 403 may be included instead of clock thinning-out circuit 303. Clock thinning-out circuit 403 may differ from clock thinning-out circuit 303 in that a portion of bits of a random number stored in register 111 may be provided to mode setting circuit 304. In this way, mode setting circuit 304 may switch the setting of first to third modes in correspondence to a random number generated by random number generating circuit 102.

Figure 6:
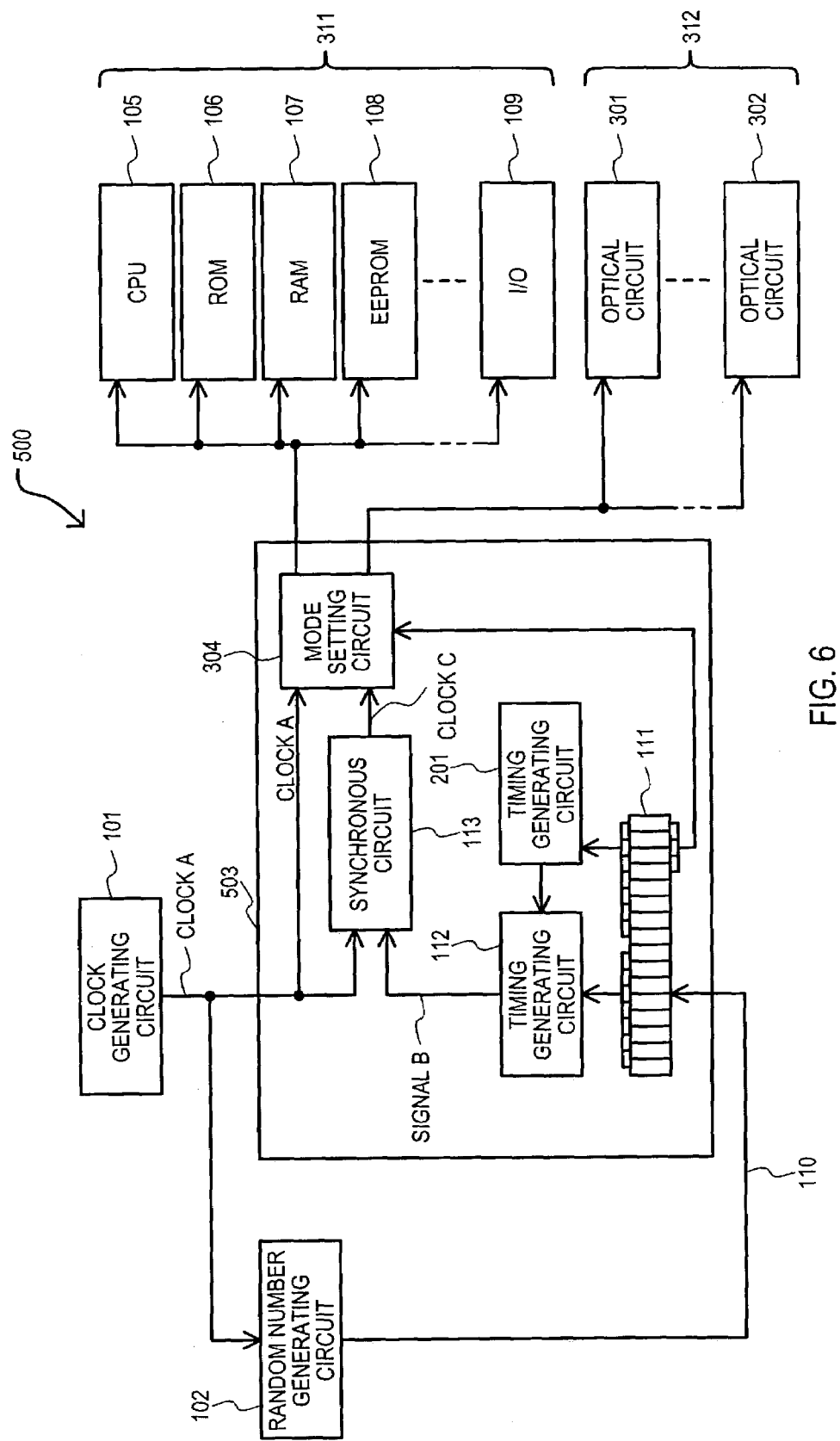
FIG. 6 is a block schematic diagram of a data processor according to an embodiment.

Referring now to FIG. 6, a block schematic diagram of a data processor according to an embodiment is set forth and given the general reference character 500. Data processor 400 may include similar constituents as data processors (100 to 400) of FIGS. 1, 3, 4, and 5 and such constituents may be referred to by the same reference character.

Data processor 500 may include a clock thinning-out circuit 503. Clock thinning-out circuit 503 may be a hybrid of clock thinning-out circuits (203 and 403). Clock thinning-out circuit 503 may include may include a register 111, timing generating circuits (112 and 201), a synchronous circuit 113, and a mode setting circuit 304. In this way, mode setting circuit 303 and timing generating circuits (112 and 201) may operate in correspondence to a random number generated by random number generating circuit 102.

Additionally, it may be possible that different parts of a data processor according to the embodiments may not be formed individually, but may be meshed into one unit.

Because a data processor according to the embodiments may have a same series of data processing executed through a random thinning-out process of a clock signal, states of the power consumption may not be identical to one another. In this way, the contents of the data processing being executed may hardly be analyzed even if power consumption is monitored.

According to the embodiments, a random thinning-out process may include randomly masking a clock signal in accordance with a random number generator. In this way, data processing may be inhibited during the masking of the clock signal and a current consumption "footprint" from a data processing sequence may be varied. By varying a current consumption footprint, the contents of data processing may be prevented from being determined even if power consumption is monitored. Masking of the clock signal may be provided by a clock thinning-out circuit in response to a variable masking signal. In this way, a clock thinning-out circuit may be conceptualized as a first circuit that may provide a variable clock masking function. The variable masking signal may be provided by a variable masking circuit, such as a random number generating circuit, as just one example.

It is understood that the embodiments described above are exemplary and the present invention should not be limited to those embodiments. Specific structures should not be limited to the described embodiments.

Thus, while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A data processor, comprising:
a first plurality of circuit resources which operate synchronously with a second clock signal;
a clock generating circuit for generating a first clock signal;
a clock thinning-out circuit for thinning out the first clock signal to provide the second clock signal;
a second plurality of circuit resources which operate synchronously with a third clock signal provided by the clock thinning out circuit; and
the clock thinning-out circuit includes a mode setting circuit for selectively setting a first mode in which the first clock signal is thinned out to provide the second clock signal and the first clock signal is not thinned out to provide the third clock signal, a second mode in which the first clock signal is thinned out to provide the third clock signal and the first clock signal is not thinned out to provide the second clock signal, and a third mode in which the first clock signal is thinned out to provide the second clock signal and the third clock signal.

2. The data processor according to claim 1, further including:
a signal generator coupled to provide a thinning-out signal to the clock tinning-out circuit.

3. The data processor according to claim 2, wherein:
the signal generator includes a random number generating circuit providing an essentially random number as the thinning-out signal; and
the clock thinning-out circuit thins out the first clock signal to provide the second clock signal when the essentially random number has a predetermined value.

4. The data processor according to claim 3, wherein:
the random number generating circuit generates the essentially random number synchronously with the first clock signal.

5. The data processor according to claim 1, wherein:
the clock thinning-out circuit thins out the first clock at a variable rate to provide the second clock.

6. The data processor according to claim 5, further including:
a signal generator coupled to provide a thinning-out signal to the clock thinning-out circuit; and
the clock thinning-out circuit provides the variable rate in response to the thinning-out signal.

7. The data processor according to claim 1, wherein:
the mode setting circuit changes the setting between the first, second, and third modes over time.

8. The data processor according to claim 1, further including:
a signal generator coupled to provide a thinning-out signal to the clock thinning-out circuit; and
the mode setting circuit changes the setting between the first, second, and third modes in response to at least a portion of the thinning-out signal.

9. A data processor, comprising:
a clock generating circuit for generating a first clock signal;
a first circuit coupled to receive the first clock signal and generate a second clock signal by variably masking portions of the first clock signal to generate the second clock signal; and
a first plurality of circuit resources operate in response to the second clock signal; and
a variable masking signal generating circuit coupled to provide a variable masking signal wherein
the first circuit receives the variable masking signal and masks a portion of the first clock signal in response to the variable masking signal having a predetermined value;
the variable masking signal includes a first variable masking portion and a second variable masking portion;
the first circuit includes
a first timing generating circuit coupled to receive the first variable masking portion and provide a first mask signal having a first mask signal logic value when the first variable masking portion has a first predetermined value;
a second timing generating circuit coupled to receive the second variable masking portion and provide a second mask signal having a second mask signal logic value when the second variable masking portion has a second predetermined value; and
a mask circuit coupled to receive the first mask signal and the second mask signal and masks a portion of the first clock signal to provide the second clock signal when the first mask signal has the first mask signal logic value and masks a portion of the first clock signal to provide the second clock signal when the second mask signal has the second mask signal logic value.

10. The data processor according to claim 9, wherein:
the variable masking signal generating circuit includes a number generating circuit coupled to receive the first clock signal and generate an essentially random number as the variable masking signal.

11. The data processor according to claim 10, wherein:
the essentially random number is generated for each clock cycle of the first clock signal.

12. The data processor according to claim 9, wherein:
the first circuit includes
a timing generating circuit coupled to receive the variable masking signal and provide a mask signal having a mask logic value when the variable masking signal has the predetermined value; and
a mask circuit coupled to receive the mask signal and masks a portion of the first clock signal to provide the second clock signal when the mask signal has the mask logic value.

13. A processor circuit, comprising:
a clock generating circuit for generating a first clock signal;
a first circuit coupled to receive the first clock signal and generate a second clock signal by variably masking portions of the first clock signal to generate the second clock signal;
a mode circuit coupled to provide a third clock signal in response to the first clock signal in a first mode and in response to the second clock signal in a second mode; and
a first plurality of circuit resources operate synchronously with the third clock signal.

14. The processor circuit according to claim 13, wherein:
the mode circuit provides a fourth clock signal in response to the second clock signal in the first mode and in response to the first clock signal in the second mode; and
a second plurality of circuit resources operate synchronously with the fourth clock signal.

15. The processor circuit according to claim 14, further wherein:
the mode circuit provides the third clock signal in response to the second clock signal in a third mode and provides the fourth clock signal in response to the second clock signal in the third mode.

16. The processor circuit according to claim 13, further including:
a variable masking signal generating circuit coupled to provide a variable masking signal wherein
the first circuit receives the variable masking signal and masks a portion of the first clock signal to generate the second clock signal in response to the variable masking signal having a predetermined value; and
the mode circuit operates in accordance with at least a portion of the variable masking signal.

17. The processor circuit according to claim 16, wherein:
the variable masking signal includes a first variable masking portion and a second variable masking portion
the first circuit includes
a first timing generating circuit coupled to receive the first variable masking portion and provide a first mask signal having a first mask signal logic value when the first variable masking portion has a first predetermined value;
a second timing generating circuit coupled to receive the second variable masking portion and provide a second mask signal having a second mask signal logic value when the second variable masking portion has a second predetermined value;
a mask circuit coupled to receive the first mask signal and the second mask signal and masks a portion of the first clock signal to provide the second clock signal when the first mask signal has the first mask signal logic value and masks a portion of the first clock signal to provide the second clock signal when the second mask signal has the second mask signal logic value.

* * * * *